US012810338B2

(12) United States Patent
Hudson et al.

(10) Patent No.: US 12,810,338 B2
(45) Date of Patent: Nov. 24, 2026

(54) INTEGRATED AI SHOPPING AND PERSONAL WARDROBE MANAGEMENT PLATFORM

(71) Applicant: VETIR, INC., New York, NY (US)

(72) Inventors: Katherine Davidson Hudson, New York, NY (US); Abhishek Rathore, Gurgaon Haryana (IN); Ashish Gupta, Gurgaon Haryana (IS)

( * ) Notice: Subject to any disclaimer, the term of this patent is extended or adjusted under 35 U.S.C. 154(b) by 34 days.

(21) Appl. No.: 18/783,331

(22) Filed: Jul. 24, 2024

(65) Prior Publication Data

US 2025/0037185 A1 Jan. 30, 2025

Related U.S. Application Data

(60) Provisional application No. 63/528,548, filed on Jul. 24, 2023.

(51) Int. Cl.
*G06Q 30/0601* (2023.01)

(52) U.S. Cl.
CPC ..... *G06Q 30/0631* (2013.01); *G06Q 30/0629* (2013.01); *G06Q 30/0639* (2013.01); *G06Q 30/0641* (2013.01)

(58) Field of Classification Search
CPC ........... G06Q 30/0631; G06Q 30/0629; G06Q 30/0639; G06Q 30/0641
(Continued)

(56) References Cited

U.S. PATENT DOCUMENTS 9,697,563 B2 * 7/2017 Fitzpatrick ......... G06Q 30/0635
10,402,037 B1 * 9/2019 Van Gorkom ........ G06F 3/0481
(Continued)

FOREIGN PATENT DOCUMENTS

CN 119631111 A * 3/2025 ............. G06N 3/082
KR 20210148591 A * 12/2021 ............. G06T 13/40
(Continued)

OTHER PUBLICATIONS

"Amazon Influencer Program—How to check your earnings in Associates Central" YouTube, uploaded by Amazon Associates Programs, Apr. 17, 2018, www.youtube.com/watch?v=ZMq6F3vHpS4 (Year: 2018).*
(Continued)

*Primary Examiner* — Ilana L Spar

(57) ABSTRACT

A method for providing a personalized shopping experience using an AI-guided omnichannel shopping application is provided. The method includes presenting a user app interface on a user device associated with a user to receive user data comprising user styling preferences, shopping habits, and images of the user's personal wardrobe inventory. The method also includes providing a virtual closet for the user, wherein the virtual closet comprises processed images of the personal wardrobe inventory of the user. The method further includes providing a personalized product feed source by filtering product data. The method additionally includes providing a personal stylist interface that allows stylists to access the virtual closet of the user. The method includes analyzing using an AI model, the user preferences and shopping habits, sales history, browsing history, and the selected items, wherein the AI model continuously learns and generating personalized product recommendations to the user.

19 Claims, 9 Drawing Sheets

(58) Field of Classification Search
USPC .......................................................... 705/26.7
See application file for complete search history.

(56) References Cited

U.S. PATENT DOCUMENTS

| | | | | |
|---|---|---|---|---|
| 11,475,487 | B1 * | 10/2022 | Tipograph | G06Q 30/0267 |
| 12,333,855 | B1 * | 6/2025 | Faraji | G06V 40/171 |
| 2018/0308149 | A1 * | 10/2018 | Guo | G06N 3/045 |
| 2019/0019235 | A1 * | 1/2019 | Sprangers | G06Q 30/0631 |
| 2023/0104294 | A1 * | 4/2023 | Minvielle Dabdoub | G06Q 30/0283 705/400 |
| 2023/0137742 | A1 * | 5/2023 | Morgan | G06Q 30/0625 705/26.62 |
| 2024/0037869 | A1 * | 2/2024 | Sholl | G06V 10/56 |

FOREIGN PATENT DOCUMENTS

| | | | | |
|---|---|---|---|---|
| WO | WO-2018200751 | A1 * | 11/2018 | H04L 67/55 |
| WO | WO-2024006570 | A1 * | 1/2024 | G06V 10/60 |
| WO | WO-2024006571 | A1 * | 1/2024 | H04N 21/42676 |

OTHER PUBLICATIONS

Amazon Influencer Program â How to check your earnings in Associates Central (Year: 2018).*

* cited by examiner

INTEGRATED AI SHOPPING AND PERSONAL WARDROBE MANAGEMENT PLATFORM

CLAIM FOR PRIORITY

This application claims priority from a prior utility provisional application with the application No. 63/528,548 filed on 24 Jul. 2023. The entire collective teachings thereof being herein incorporated by reference.

FIELD OF THE INVENTION

This invention generally relates to the field of digital wardrobe management and personal styling, more specifically, to an integrated AI shopping and personal wardrobe management platform for providing a personalized shopping experience. The system provides an integrated platform for closet management, personal shopping and video shopping, and client-stylist interaction.

BACKGROUND OF THE INVENTION

The rapid advancement of technology has significantly transformed the retail industry, introducing various digital tools and platforms aimed at enhancing the shopping experience. Traditional shopping methods, both online and offline, have evolved to integrate more personalized approaches, aiming to cater to individual customer preferences. Despite these advancements, existing systems often fall short in providing a truly unified and personalized shopping experience that seamlessly blends different shopping channels.

Conventional online shopping platforms typically rely on static algorithms and basic data analytics to recommend products to users. These platforms may suggest items based on past purchases or general browsing history, but they lack the sophistication needed to offer comprehensive and context-aware recommendations. Furthermore, while some platforms have introduced personal stylist services, these functionalities are usually fragmented, not integrated into a cohesive system. Additionally, traditional methods for managing personal wardrobes involve manual input and organization, which can be cumbersome and inefficient. Users must often upload and categorize their wardrobe items without any automated assistance, resulting in incomplete or inaccurate virtual closets. This disjointed approach limits the effectiveness of personalized recommendations and hampers the overall shopping experience.

Existing shopping systems often operate in silos, with e-commerce, social media, and personal stylist services functioning independently. This fragmentation results in a disjointed user experience, where consumers must navigate multiple platforms to complete their shopping journey, leading to inconvenience and inefficiency. Many traditional shopping systems do not fully leverage advanced AI technologies to continuously learn and adapt to user behaviors. The absence of a robust AI-driven approach means that recommendations do not improve over time, failing to provide an increasingly personalized and engaging shopping experience.

Accordingly, there remains a need to address the aforementioned technical drawbacks in providing a seamless, highly personalized shopping experience that integrates various channels and leverages advanced AI capabilities to continuously learn from and adapt to user preferences and behaviors.

BRIEF SUMMARY OF THE INVENTION

The first aspect of the present disclosure provides a method performable in an AI-guided omnichannel shopping system comprising a user device communicatively connected to a server for providing a personalized shopping experience. The method comprises receiving user data comprising user styling preferences, personal measurements, shopping habits, and images of the user's personal wardrobe inventory by presenting a user app interface on the user device. Further, the method comprises processing the images of the personal wardrobe inventory of the user. The images are processed by extracting data points including a type, a brand, a size, a color, and a condition of the wardrobe inventory from the images by removing backgrounds. The processed images are categorized based on the extracted data points in the user's virtual closet. The method further comprises generating a personalized product feed source by filtering product data obtained from multiple retailers based on user data. The personalized product feed source comprises selected items to match the user's style preferences. The product data is obtained from both online and offline resources. The method further comprises enabling marking of recommended items by a stylist by presenting a personal stylist interface that allows the stylist to access the virtual closet of the user and the personalized product feed. The marking of recommended items is presented in a dedicated "For You" section in the user app interface. The method further comprises analyzing using an AI model, the user preferences and shopping habits, sales history, browsing history, purchase history and the selected items. The AI model continuously learns from user inputs across various channels, comprising e-commerce, video, social media, and stylist interactions. The method further comprises generating personalized product recommendations to the user using the AI model through the user app interface. The personalized product recommendations comprise outfit suggestions that match the user's style preferences and wardrobe needs, complementary products, seasonal and trending items, and exclusive offers and deals.

In an embodiment, the method further comprises (i) obtaining product information of the selected items from the multiple retailers. The product information comprises product name, description, price, specification, image, availability, vendor information, user reviews and ratings, warranty and return policy, shipping details, SKU or product ID, brand, instructions or manuals, (ii) comparing the price of the selected items from the multiple retailers to select a retailer offering the best deal for the user. The price comparison is performed by obtaining real-time updates from multiple retailers' databases to provide the most current prices, (iii) presenting to the user through the user app interface, the product information of the selected item from the selected retailer, (iv) initiating and receiving a confirmation to purchase the selected item from the user through the user device, (v) initiating a transaction in response to receiving the confirmation from the user with the selected retailer to purchase the selected item, and (vi) transmitting purchase and payment information from the user to a transaction system of the selected retailer for purchase.

In another embodiment, the method further comprises generating the images of the wardrobe inventory of the user based on products searched by the user using any of textual inputs, graphical user interface, swipe buttons, drag and drop, AI guided search features, voice inputs, image inputs via the user app interface, wherein the generated images are added to the virtual closet of the user.

In yet another embodiment, the method further comprises enabling (i) social sharing of the selected items added to a virtual cart, finds, and reviews with friends and family, and (ii) access to community reviews and ratings that assist the user in making informed purchasing decisions.

In yet another embodiment, the method further comprises (i) integrating a video shopping component that allows the user to watch shoppable videos featuring products, and (ii) displaying a correlated product feed under a video feed to allow the user to shop for products featured in the video in real-time.

In yet another embodiment, the method further comprises allowing the user to interface with the personal stylist virtually via in-app chat and video styling sessions.

In yet another embodiment, the method further comprises enabling the stylist to provide tailored product suggestions to multiple users based on their preferences and past purchases.

In yet another embodiment, the method further comprises aggregating and displaying detailed statistics about the user's wardrobe including inventory count, total value, and usage metrics via a data dashboard.

In yet another embodiment, the method further comprises integrating with third-party e-commerce platforms to expand the range of products available for the user to shop.

In yet another embodiment, the method further comprises synchronizing with the user's calendar to provide outfit suggestions for specific events and occasions.

In yet another embodiment, the method further comprises sending notifications to the user about discounts, sales, and special offers on the selected items. The frequency of notifications is automatically tuned based on the user's interaction patterns with the AI-guided omnichannel shopping application.

The second aspect of the present disclosure provides an AI-guided omnichannel shopping system for providing a personalized shopping experience. The system comprises a user device associated with a user, a server and a memory communicably connected to the server. The server is configured to receive user data comprising user styling preferences, personal measurements, shopping habits, and images of the user's personal wardrobe inventory by presenting a user app interface on the user device. The server is further configured to process the images of the personal wardrobe inventory of the user. The images are processed by extracting data points including a type, a brand, a size, a color, and a condition of the wardrobe inventory from the images by removing backgrounds. The processed images are categorized based on the extracted data points in the user's virtual closet. The server is further configured to generate a personalized product feed source by filtering product data obtained from multiple retailers based on the user data. The personalized product feed source comprises selected items to match the user's style preferences. The product data is obtained from both online and offline resources. The server is further configured to enable AI search tools comprising clothing and accessories using augmented reality (AR) features. The AI search tools operate in real-time. The server is further configured to enabling marking of recommended items by a stylist by presenting a personal stylist interface that allows the stylist to access the virtual closet of the user and the personalized product feed. The marking of recommended items is presented in a dedicated "For You" section in the user app interface. The server is further configured to analyze using an AI model, the user preferences and shopping habits, sales history, browsing history, purchase history and the selected items. The AI model continuously learns from user inputs across various channels, comprising e-commerce, video, social media, and stylist interactions. The server is further configured to generate personalized product recommendations to the user using the AI model through the user app interface. The personalized product recommendations comprise outfit suggestions that match the user's style preferences and wardrobe needs, complementary products, seasonal and trending items, and exclusive offers and deals.

The third aspect of the present disclosure provides a non-transitory computer-readable storage medium in an AI-guided omnichannel shopping system comprising a user device communicatively connected to a server, the computer-readable storage medium storing programming instructions that, if executed by a processor in the AI-guided omnichannel shopping system, are operable to cause the digital retail shopping system to perform the operations comprising, (i) receiving user data comprising user styling preferences, personal measurements, shopping habits, and images of the user's personal wardrobe inventory by presenting a user app interface on the user device; (ii) processing the images of the personal wardrobe inventory of the user. The images are processed by extracting data points including a type, a brand, a size, a color, and a condition of the wardrobe inventory from the images by removing backgrounds. The processed images are categorized based on the extracted data points in the user's virtual closet; (iii) generating a personalized product feed source by filtering product data obtained from multiple retailers based on the user data. The personalized product feed source comprises selected items to match the user's style preferences. The product data is obtained from both online and offline resources; (iv) enabling AI search tools of the selected items comprising clothing and accessories using augmented reality (AR) features. The AI search tools allow for choosing items in real-time; (v) enabling marking of recommended items by a stylist by presenting a personal stylist interface that allows the stylist to access the virtual closet of the user and the personalized product feed. The marking of recommended items is presented in a dedicated "For You" section in the user app interface; (vi) analyzing using an AI model, the user preferences and shopping habits, sales history, browsing history, purchase history and the selected items. The AI model continuously learns from user inputs across various channels, comprising e-commerce, video, social media, and stylist interactions; and (vii) generating personalized product recommendations to the user using the AI model through the user app interface. The personalized product recommendations comprise outfit suggestions that match the user's style preferences and wardrobe needs, complementary products, seasonal and trending items and exclusive offers and deals.

The AI-guided omnichannel shopping system of the present disclosure provides a pioneering platform that integrates multiple consumer touchpoints and retail entities into a single, seamless digital environment. The novel platform benefits both end-users and providers, including retailers and personal stylists. The system merges various shopping channels, allowing consumers to shop from brick-and-mortar stores, e-commerce sites, personal shoppers, social media, and shoppable videos. The system features a shoppable video technology that transforms video content into interactive shopping experiences. This integration ensures that consumers no longer need to switch between different fragmented touchpoints but can enjoy a unified shopping ecosystem enriched with machine learning and AI on the backend. The AI model continuously learns from user inputs across various channels, including e-commerce, video, social media, and stylist interactions. It filters and prioritizes products, content, and experiences that align with the user's preferences. This ensures that the shopping experience is highly personalized and relevant.

On the stylist side, the system offers tools to manage their clients more effectively. Stylists can digitally send product recommendations, monitor sales in real-time through a sales dashboard, and create shoppable videos. This allows them to upsell items from their clients' existing wardrobes, leveraging contextual data to enhance their styling services. The system also enables stylists to scale their business digitally, maintaining real-time connections with their clients and offering personalized services remotely.

BRIEF DESCRIPTION OF THE DRAWINGS

A clear understanding of the key features of the invention summarized above may be had by reference to the appended drawings, which illustrate the method and system of the invention, although it will be understood that such drawings depict preferred embodiments of the invention and, therefore, are not to be considered as limiting its scope with regard to other embodiments which the invention is capable of contemplating. Accordingly.

Like reference numerals refer to like parts throughout the several views of the drawings.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims. An AI-guided omnichannel shopping system for providing a personalized shopping experience and method thereof is discussed herein. In the following description, for purposes of explanation, numerous specific details are set forth in order to provide a thorough understanding of the present invention. It will be evident, however, to one skilled in the art that the present invention may be practiced without these specific details. The present disclosure is to be considered as an exemplification of the invention and is not intended to limit the invention to the specific embodiments illustrated by the figures or description below. The present invention will now be described by referencing the appended figures representing preferred embodiments.

Figure 1:
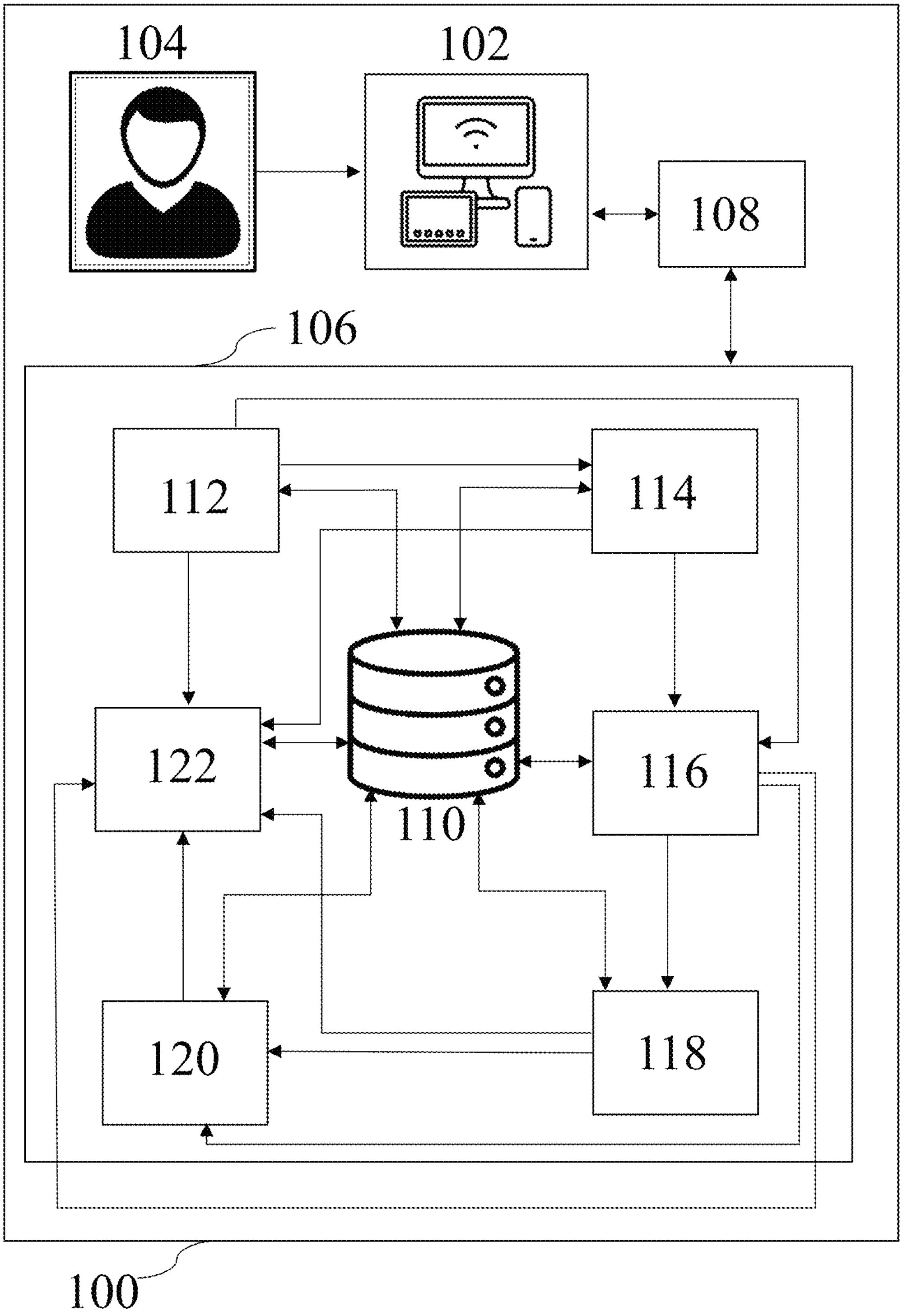
FIG. 1 illustrates an AI-guided omnichannel shopping system for providing a personalized shopping experience according to various embodiments of the present disclosure.

FIG. 1 illustrates an AI-guided omnichannel shopping system for providing a personalized shopping experience according to various embodiments of the present disclosure. The system 100 includes a user device 102 associated with a user 104, a server 106 and a communication network 108. The user device 102 is communicatively connected to the server 106 through the communication network 108. The server 106 includes a plurality of modules and an AI model stored in a database 110 to provide a personalized shopping experience to the user 104. The plurality of modules of the server 106 includes a user data receiving module 112 configured to receive user data comprising user styling preferences, personal measurements, shopping habits, and images of the user's personal wardrobe inventory by presenting a user app interface on the user device. The plurality of modules of the server 106 further includes an image processing module 114 configured to process the images by extracting data points including a type, a brand, a size, a color, and a condition of the wardrobe inventory from the images by removing backgrounds. The processed images are categorized based on the extracted data points in the user's virtual closet. Optionally, the user 104 is enabled to create and manage their virtual closet. The user 104 may share their virtual closet and outfits with friends or on social media, creating a personalized shopping environment. The user 104 may control the privacy of their shared virtual closets, limiting access as desired. The plurality of modules of the server 106 further includes a personalized product feed generation 116 configured to generate a personalized product feed source by filtering product data obtained from multiple retailers based on the user data. The personalized product feed source comprises selected items to match the user's style preferences. The product data is obtained from both online and offline resources. The plurality of modules of the server 106 further includes an Augmented Reality (AR) module 118 that AI search tools comprising clothing and accessories using augmented reality (AR) features. The AI search tools utilize camera of the user device 102 to choose items in real-time. The plurality of modules of the server 106 further includes a recommended items marking module 120 configured to enable marking of recommended items by a stylist by presenting a personal stylist interface that allows the stylist to access the virtual closet of the user and the personalized product feed. The marking of recommended items is presented in a dedicated "For You" section in the user app interface. In an embodiment, the system 100 facilitates the stylist to interact with the user 104 through an integrated chat functionality, providing personalized product recommendations. The system 100 enables stylists to set automated follow-ups and reminders for clients, such as suggesting outfits for upcoming events or notifying them of new arrivals that match their style. This feature ensures ongoing engagement and helps maintain a strong stylist-client relationship.

The AI model 122 of the server 106 is configured to analyse the user preferences and shopping habits, sales history, browsing history, purchase history and the selected items. For example, The AI model 122 may recommend shoes to user 104 who has recently purchased a new dress. The AI model 122 includes an AI training module that continuously learns from user inputs across various channels, comprising e-commerce, video, social media, and stylist interactions. The AI model 122 continuously learns from user inputs to refine user preferences and make tailored recommendations. The AI model 122 is configured to generate personalized product recommendations to the user through the user app interface. The AI model 122 provides personalized product recommendations comprising outfit suggestions that match the user's style preferences and wardrobe needs, complementary products, seasonal and trending items and exclusive offers and deals. The AI model 122 further analyzes shopping behaviors and the virtual closet data of the user 104 to suggest products and content that align with user preferences. The virtual closet the AI-guided omnichannel shopping system leverages style-based data points to provide a deeply personalized experience. The AI analyzes the contents of the user's virtual closet, identifying key attributes such as style, color preferences, fabric types, and brand affinities. It also tracks how often items are worn and in what combinations, providing insights into the user's fashion trends and habits. This data-driven approach enables the system to make precise outfit recommendations, suggest complementary products, and highlight gaps in the wardrobe that could be filled with new purchases. By continuously learning from the user's interactions and preferences, the virtual closet becomes a powerful tool for personalized fashion management and discovery. The AI model 122 identifies and recommends brands and products that align with luxury shopping trends and user preferences. The system 100 may work on a Commission-Based Model, where vendors connect through API feeds, and the system takes a commission on sales. Further, the stylists earn commissions on direct product recommendations and passive sales from the users they bring to the platform.

The system 100 incorporates advanced analytics and data integration within its CRM closet management feature, offering a comprehensive data dashboard for both users and stylists. This sophisticated dashboard aggregates data from various touchpoints, including user interactions, purchase history, browsing behavior, and virtual closet contents. It provides detailed insights into wardrobe usage patterns, style preferences, and trending items. Stylists can access this data to better understand their clients' needs and preferences, enabling them to offer more precise and personalized recommendations. The analytics tools track key metrics such as sales conversions, client engagement, and inventory movement, providing actionable insights that drive decision-making and strategy. This seamless integration of data not only enhances the user experience but also empowers stylists and retailers with the information they need to optimize their services, improve client satisfaction, and boost overall sales performance.

The system 100 provides a real-time sales dashboard that tracks product performance, impressions, and engagement. The tracked data is analyzed to optimize the way the that products are displayed on a website or in a store. The merchandising optimization improves the customer experience and increase sales. The system 100 integrates a video shopping component that allows the user 104 to watch shoppable videos featuring products. The products may appear as clickable links within video content, enabling direct purchases. The system 100 may be integrated with events like New York Fashion Week to make runway items shoppable in real-time. The system 100 may provide the user 104 with additional assistance, such as from a virtual stylist or chatbot. The system 100 facilitates the user 104 to checkout and pay for products without leaving the retailer's website or app which improves the customer experience and increase conversion rates. The interfaces including appearance, including logos, color schemes, fonts, and layouts, may be tailored to match the retailer's brand identity. The interfaces may be designed to reflect the retailer's unique style and approach, ensuring consistency across all touchpoints. The system 100 integrates with the retailer's existing e-commerce platform, inventory management systems, and other backend services, ensuring smooth operation within the retailer's ecosystem. Retailers may be enabled to control all displayed content, ensuring that all product descriptions, images, videos, and recommendations align with their brand voice and messaging. The AI model 122 may provide insights to the retailers to optimize product displays and inventory management, ensuring that the most relevant products are highlighted, thereby increasing sales while maintaining the brand's aesthetic. The system 100 facilitates the users to shop through various channels, including brick-and-mortar, e-commerce, personal shoppers, social media, and video commerce. The system 100 provides a universal shopping cart allows seamless transactions across multiple vendors within a single checkout process that keeps customers within the retailer's branded environment, enhancing the overall shopping experience and reducing cart abandonment.

Figure 2:
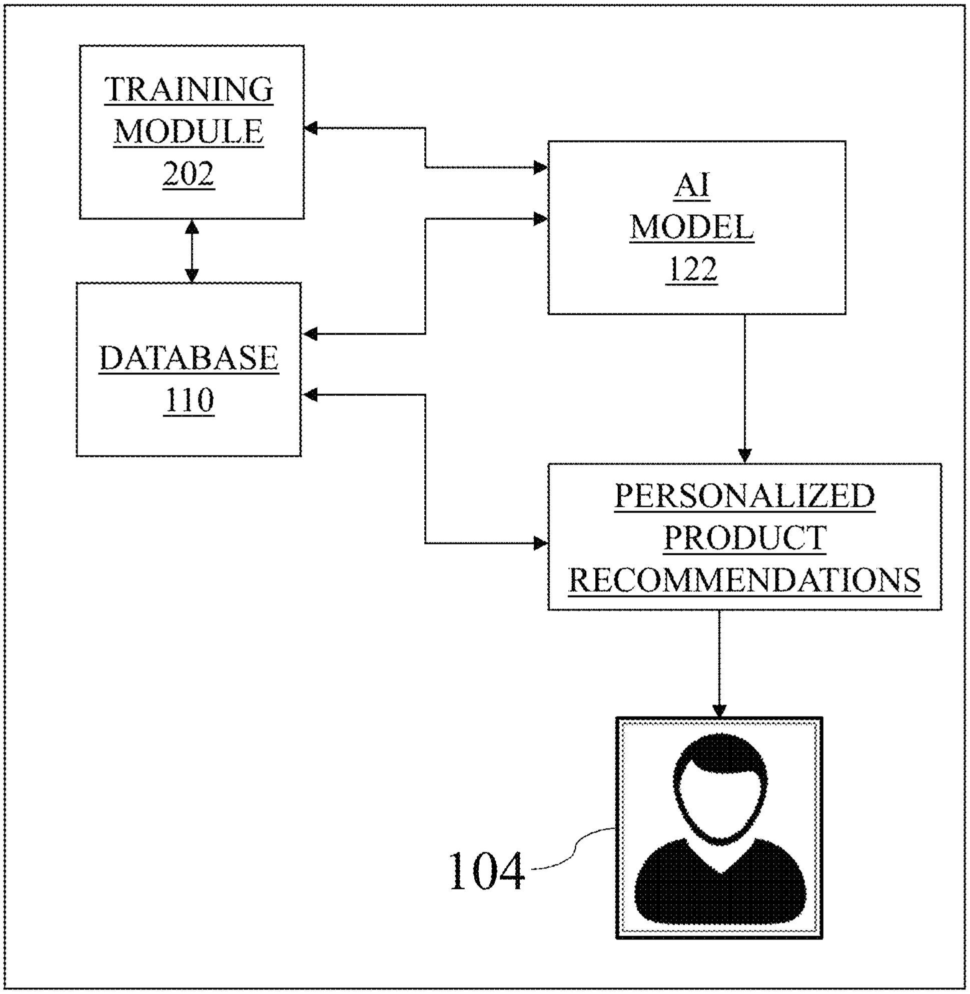
FIG. 2 illustrates the server hosting the AI model of FIG. 1 according to various embodiments of the present disclosure.

FIG. 2 illustrates the server hosting the AI model of FIG. 1 according to various embodiments of the present disclosure. The AI model 122 is trained using the training module 202. The database 110 stores the attributes for training the AI model 122. The AI model 122 provides personalized product recommendations to the user 104 through the user app interface. The attributes used for training the AI model 122 encompass a comprehensive set of user-centric and contextual data. This includes detailed user preferences and behaviors, such as past purchases, browsing history, and shopping behaviors, collected across various channels like e-commerce, video, social media, and stylist interactions. Product attributes, including outfit suggestions, complementary products, seasonal items, trending items, and exclusive offers, are also integral to the training process. Additionally, the AI model 122 leverages user wardrobe data from virtual closets, capturing existing wardrobe items and their usage patterns. Demographic information, such as age, gender, geographic location, and style preferences, further refines the personalization. Interaction data, including the frequency and nature of user-stylist engagements and social media activities, are analyzed to enhance recommendations. Contextual factors, such as current seasonal trends and upcoming events, are considered to ensure the recommendations are timely and relevant. By incorporating these diverse attributes, the AI model is capable of providing highly personalized product recommendations that align with the user's style preferences, wardrobe needs, and current fashion trends.

Figure 3:
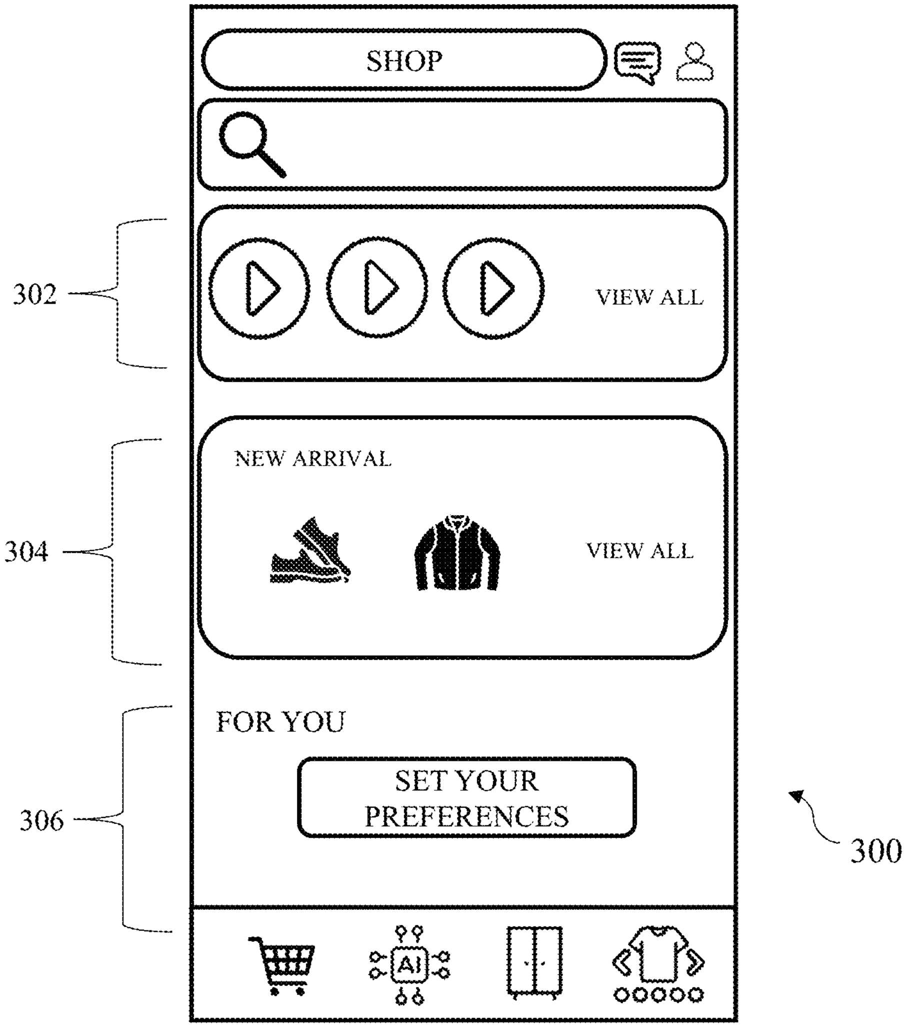
FIG. 3 illustrates a sample user interface provided by the system of FIG. 1 that presents products for purchase on the user device according to various embodiments of the present disclosure.

FIG. 3 illustrates a sample user interface provided by the system of FIG. 1 that presents products for purchase on the user device according to various embodiments of the present disclosure. The interface 300 presents a shoppable video feed feature 302, which transforms video content into an interactive shopping experience. As the user 104 watch videos showcasing the latest fashion trends, runway shows, or style tutorials, they can instantly view and purchase the featured products directly from the video. This seamless integration allows the user 104 to click on items as they appear, providing detailed product information and adding desired items to their shopping cart without leaving the video interface. This innovative feature enhances engagement and provides a dynamic, immersive shopping experience that blends entertainment with convenience. The interface 300 presents an AI-driven new arrivals feature 304 that curates the latest products tailored to individual user preferences. By analyzing past purchase behavior, browsing history, and emerging fashion trends, the AI identifies and highlights new arrivals that align with each user's unique style and interests. This personalized approach ensures that the user 104 is always up-to-date with the freshest and most relevant items in the store, enhancing their shopping experience and encouraging continuous exploration of new products. The interface 300 presents a personalized product feed feature 306 delivering a bespoke selection of products based on the user's specified preferences and interactions. By leveraging data from various touchpoints such as previous purchases, virtual closet contents, stylist recommendations, and social media engagements, the AI model 122 crafts a curated product feed that resonates with the user's tastes and needs. This feed includes outfit suggestions, complementary products, and exclusive deals tailored to the user's style profile. The system continuously learns and adapts, ensuring that the product recommendations remain relevant and enticing, fostering a highly personalized and satisfying shopping experience.

Figure 4:
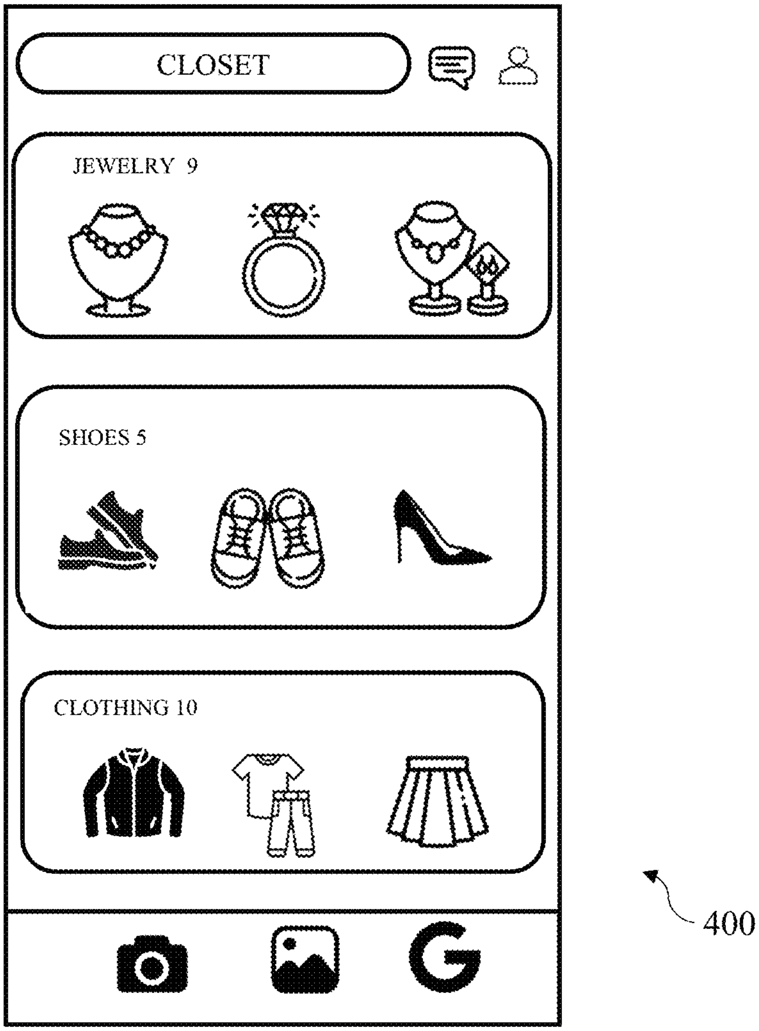
FIG. 4 illustrates a sample interface of the virtual closet of the FIG. 1 according to various embodiments of the present disclosure.

FIG. 4 illustrates a sample interface of the virtual closet of the FIG. 1 according to various embodiments of the present disclosure. The sample interface 400 enables users to upload and organize their wardrobe with ease. By simply taking photos or uploading images of their clothing items, users can create a virtual replica of their physical closet. This tool allows users to categorize items by type, color, brand, or season, making it simple to track and manage their wardrobe. Additionally, users can save outfit combinations, plan future looks, and even share their virtual closet with friends or stylists for collaborative styling. This seamless digital integration transforms closet management into a streamlined, interactive experience. The interface enables a post-purchase automated closet upload feature. Whenever the user 104 makes a purchase through the interface, the new item is automatically added to their virtual closet. This automation ensures that the user 104 always has an up-to-date inventory of their wardrobe without the need for manual entry. By keeping the virtual closet current, the user 104 can effortlessly see how new acquisitions complement their existing items, facilitating better outfit planning and maximizing the use of their wardrobe.

Figure 5:
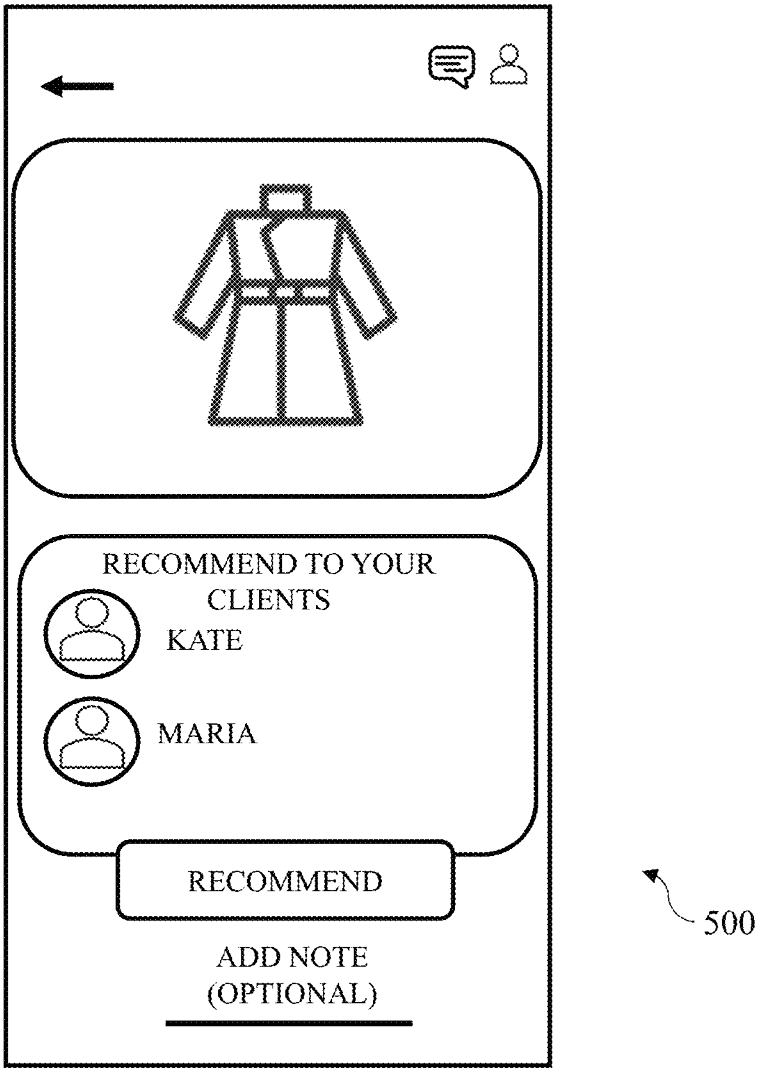
FIG. 5 illustrates a sample interface provided by the system of FIG. 1 for the stylist to recommend products to the user according to various embodiments of the present disclosure.

FIG. 5 illustrates a sample interface provided by the system of FIG. 1 for the stylist to recommend products to the user according to various embodiments of the present disclosure. The interface 500 facilitates stylists to provide personalized recommendations to the user 104. The interface allows stylists to access detailed profiles of the user 104, including personal preferences, past purchases, browsing history, and virtual closet contents. Stylists can quickly understand each user's unique style, size, favorite brands, and fashion needs, enabling them to make more informed and tailored recommendations. Stylists can engage with the user 104 through integrated chat and video call features. This real-time communication allows for immediate feedback, ensuring that recommendations align with the client's preferences and requirements. It also facilitates a more personal and interactive shopping experience. Using the virtual closet data, stylists can create and suggest complete outfits from the client's existing wardrobe and new items available on the platform. The interface provides visual tools for mixing and matching clothing and accessories, helping clients visualize potential looks.

Figure 6:
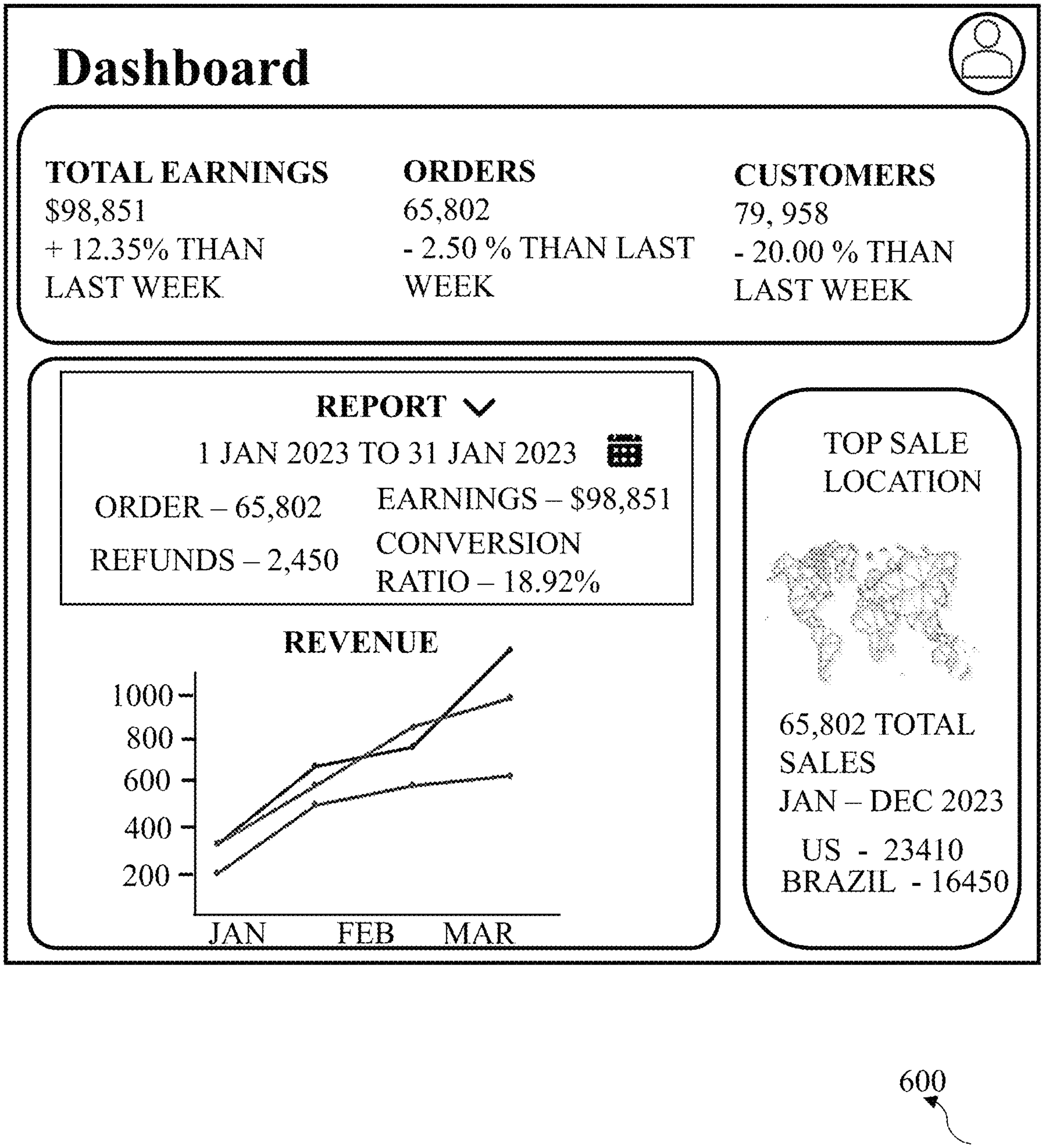
FIG. 6 illustrates a sample interface provided by the system of FIG. 1 presenting a data dashboard according to various embodiments of the present disclosure.

FIG. 6 illustrates a sample interface provided by the system of FIG. 1 presenting a data dashboard according to various embodiments of the present disclosure. The data dashboard 600 provides a detailed breakdown of revenue generated by each customer (i.e.) user 104. This includes total spending, average order value, and the number of purchases over specific time periods. Visualizations such as graphs and charts depict purchase trends and patterns. These insights help understand peak buying times, seasonal trends, and the impact of promotions or new arrivals on customer spending. The data dashboard 600 offers real-time updates, ensuring that stylists and retailers have the most current data at their fingertips. This real-time aspect is vital for making timely decisions and responding quickly to market changes. Users can generate customizable reports that suit their specific needs, whether for weekly performance reviews, quarterly financial planning, or annual strategy sessions. These reports can be exported and shared easily with relevant stakeholders.

Figure 7A:
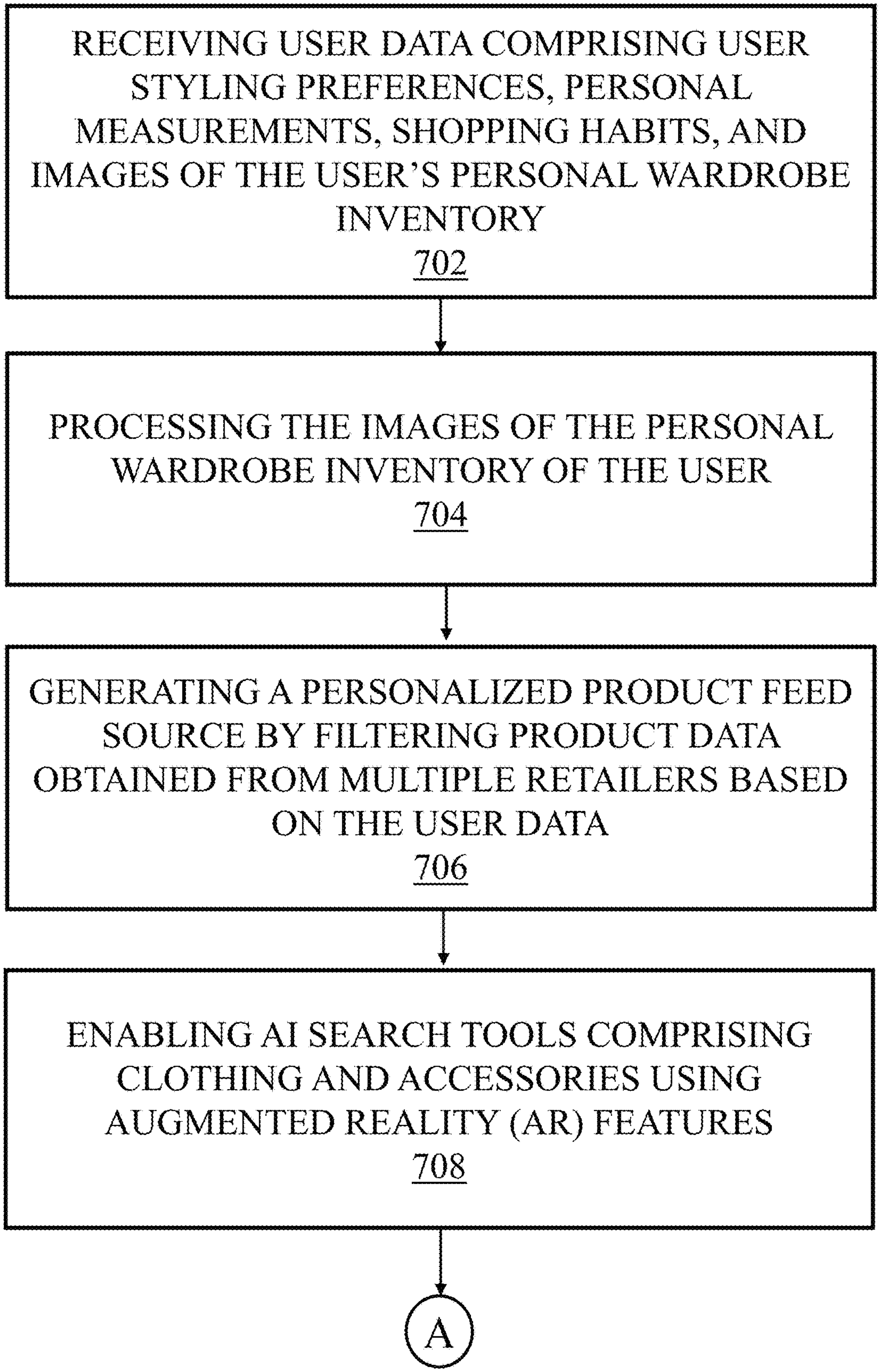
FIGS. 7A-7B are flow diagrams that illustrate a method performable in an AI-guided omnichannel shopping system comprising a user device communicatively connected to a server for providing a personalized shopping experience according to various embodiments of the present disclosure.
Figure 7B:
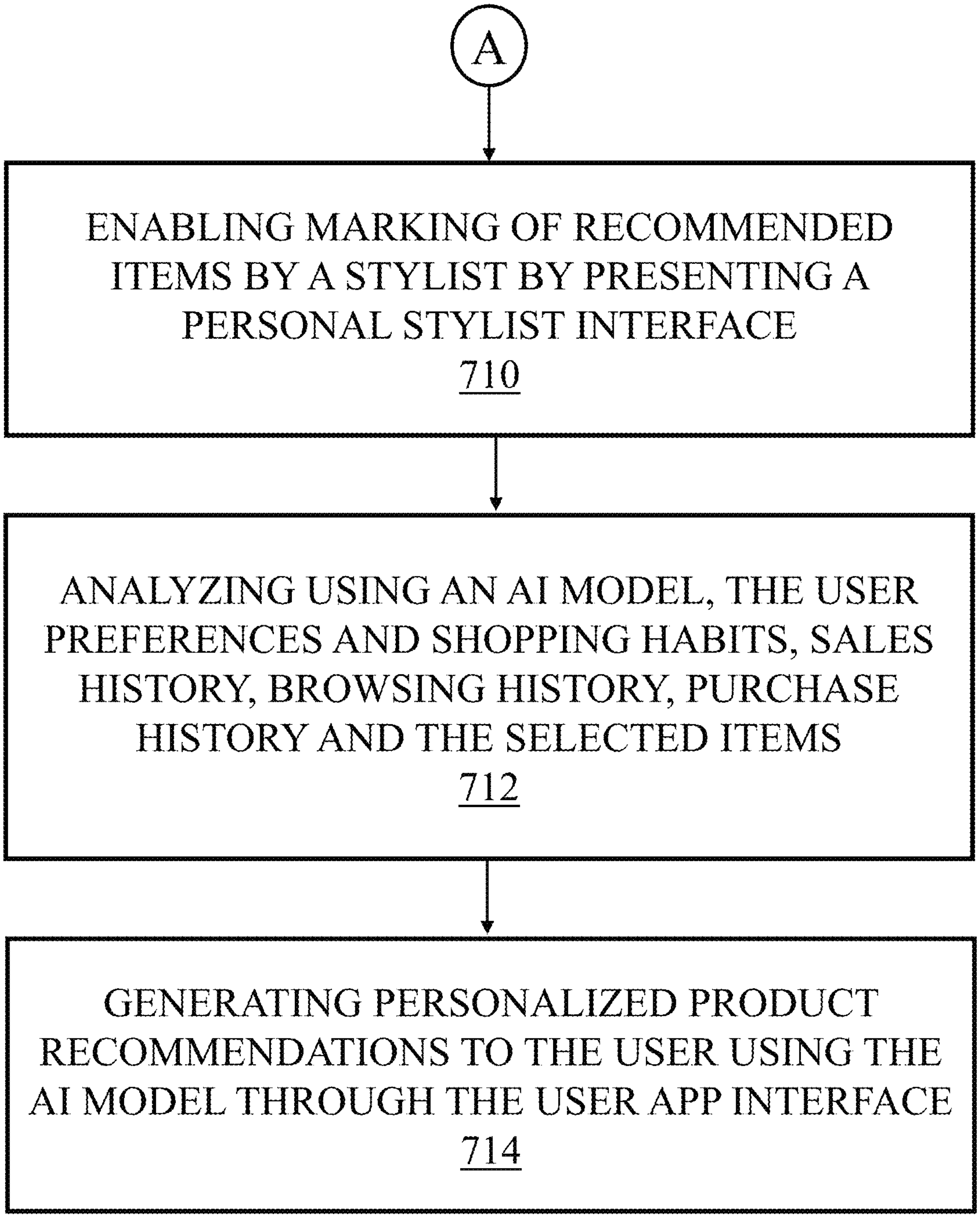

FIGS. 7A-7B are flow diagrams that illustrate a method performable in an AI-guided omnichannel shopping system comprising a user device communicatively connected to a server for providing a personalized shopping experience according to various embodiments of the present disclosure. The method includes at step 702, receiving user data comprising user styling preferences, personal measurements, shopping habits, and images of the user's personal wardrobe inventory by presenting a user app interface on the user device. The method includes at step 704, processing the images of the personal wardrobe inventory of the user. The images are processed by extracting data points including a type, a brand, a size, a color, and a condition of the wardrobe inventory from the images by removing backgrounds. The processed images are categorized based on the extracted data points in the user's virtual closet. The method includes at step 706, generating a personalized product feed source by filtering product data obtained from multiple retailers based on the user data. The personalized product feed source comprises selected items to match the user's style preferences. The product data is obtained from both online and offline resources. The method includes at step 708, enabling AI search tools of the selected items comprising clothing and accessories using augmented reality (AR) features. The AI search tools utilize camera of the user device to choose items in real-time. The method includes at step 710, enabling marking of recommended items by a stylist by presenting a personal stylist interface that allows the stylist to access the virtual closet of the user and the personalized product feed. The marking of recommended items is presented in a dedicated "For You" section in the user app interface. The method includes at step 712, analyzing using an AI model, the user preferences and shopping habits, sales history, browsing history, purchase history and the selected items. The AI model continuously learns from user inputs across various channels, comprising e-commerce, video, social media, and stylist interactions. The method includes at step 714, generating personalized product recommendations to the user using the AI model through the user app interface. The personalized product recommendations comprise outfit suggestions that match the user's style preferences and wardrobe needs, complementary products, seasonal and trending items and exclusive offers and deals.

The system of the present disclosure targets the luxury market, catering to high-spending consumers who often work with personal stylists. The technology, however, has broader applications, potentially extending to areas such as interior design, event ticketing, and gym class bookings. The unique integration of AI, omnichannel shopping, and personalized styling within a single platform distinguishes the system of the present disclosure from existing fragmented B2B styling and e-commerce solutions.

Figure 8:
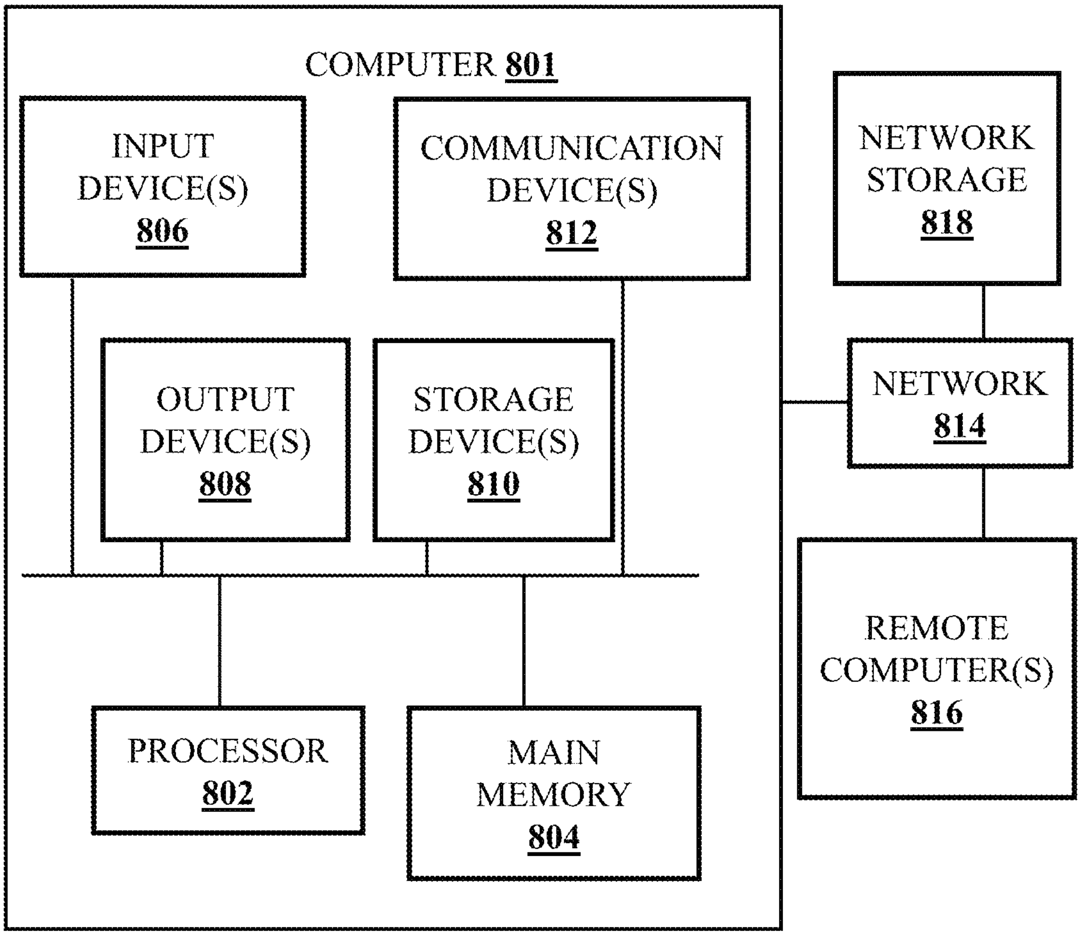
FIG. 8 illustrates a general computer architecture that can be appropriately configured to implement components disclosed in accordance with various embodiments of the present disclosure.

FIG. 8 illustrates a general computer architecture that can be appropriately configured to implement components disclosed in accordance with various embodiments of the present disclosure. The general computing architecture 800 can include various common computing elements, such as a computer 801, a network 814, and one or more remote computers 816. The computer 801 may be a server, a desktop computer, a laptop computer, a tablet computer or a mobile computing device. The computer 801 may include a processor 802, a main memory 804 and a system bus. The processor 802 may feature one or more processing units that can operate independently of each other. The main memory 804 may include volatile devices, non-volatile devices, or other random access memory devices. The computer 801 may feature secondary storage 810, consisting of one or more removable and/or non-removable storage units. These units house an operating system that manages various applications on the computer 801. The secondary storage 810 may also be used to store software configured to implement the components of the embodiments disclosed herein, which may be executed as one or more applications under the operating system. The computer 801 may also include a communication device(s) 812 through which the computer communicates with other devices, such as one or more remote computers 816, over wired and/or wireless computer networks 814. The communication device(s) 812 may communicate over but not limited to Wi-Fi, Bluetooth, ultra-wide band technology, and mobile telephone networks. The computer 801 may also access network storage 818 through computer network 814. The network storage 818 may include a network-attached storage device or cloud-based storage. The operating system and/or software may be stored in network storage 818. The computer 801 may have various input device(s) 806 for example, keyboard, mouse, touchscreen, camera, microphone, or a sensor, output device(s) 808, for example, a display, speakers or a printer. Storage devices 810, the communication device(s) 812, input devices 806 and output devices 808 may be integrated within a computer system or connected through various computer input/output interface devices.

While the present invention has been described in terms of particular embodiments and applications, in both summarized and detailed forms, it is not intended that these descriptions in any way limit its scope to any such embodiments and applications, and it will be understood that many substitutions, changes and variations in the described embodiments, applications and details of the method and system illustrated herein and of their operation can be made by those skilled in the art without departing from the spirit of this invention. In some embodiments, the method or methods described above may be executed or carried out by a computing system including a tangible computer-readable storage medium, also described herein as a storage machine, that holds machine-readable instructions executable by a logic machine (i.e. a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, flash drives, cloud storage, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard or gaming controller. For example, a user input may indicate a request that certain task is to be executed by the computing system, such as requesting the computing system to display any of the above described information, or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

The present invention has been described with reference to the preferred embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further it is intended that any other embodiments of the present invention that result from any changes in application or method of use or operation, method of manufacture, shape, size, or materials which are not specified within the detailed written description or illustrations contained herein are considered within the scope of the present invention.

What is claimed is:

1. A method for providing a personalized shopping experience using an AI-guided omnichannel shopping application, comprising:

receiving, via a user app interface presented on a user device associated with a user, user data comprising user styling preferences, shopping habits, and images of the user's personal wardrobe inventory;

processing, by an image processing module executed on a server, images of the personal wardrobe inventory of the user by extracting data points including a type, a brand, a size, a color, and a condition of the wardrobe inventory from the images by removing backgrounds to provide a virtual closet for the user, wherein the processed images are categorized based on the extracted data points in the virtual closet of the user;

creating, via the server, a personalized shopping environment based on the virtual closet and on outfits derived from the virtual closet, the virtual closet and the outfits being shared with friends or on social media, wherein the server is configured to control privacy of the shared virtual closet to limit access to the shared virtual closet based at least on the user;

filtering product data obtained from multiple retailers to provide a personalized product feed source, wherein the personalized product feed source comprises selected items to match the user's style preferences, wherein the product data is obtained from both online and offline resources;

integrating augmented reality (AR) features to enable personalized AI search tools of the selected items comprising clothing and accessories, wherein the AI search tools utilize a camera of the user device to select items in real-time;

providing a personal stylist interface that allows a stylist to access the virtual closet of the user and the personalized product feed, wherein the stylist is enabled to mark recommended items, that appear in a dedicated "For You" section in the user app interface;

training, by a training module executed on the server, and continuously updating an AI model using interaction data received across multiple channels comprising e-commerce platforms, video feeds, social media interactions, and stylist interactions;

capturing stylist interaction data associated with stylist recommendations provided through the personal stylist interface and using the stylist interaction data as input to continuously refine the AI model;

capturing user interaction outcome data associated with user interactions with recommended items, including selection and purchase activity, and using the user interaction outcome data to further refine the AI model;

determining a plurality of attributes associated with the user data, the plurality of attributes comprising virtual closet attributes, usage attributes, and contextual attributes, the virtual closet attributes comprising style, color preference, fabric type, and brand affinity identified from contents of the virtual closet, the usage attributes comprising a frequency with which items of the virtual closet are worn and combinations in which the items are worn, and the contextual attributes comprising seasonal trends and upcoming events;

iteratively refining the AI model, using the plurality of attributes, during operation of the AI-guided omnichannel shopping application, to improve relevance and personalization of recommendations over time;

generating personalized product recommendations to the user using the AI model through the user app interface, wherein the personalized product recommendations comprise outfit suggestions that match the user's style preferences and wardrobe needs, complementary products, seasonal and trending items and exclusive offers and deals;

integrating the AI-guided omnichannel shopping application with a plurality of third-party e-commerce platforms to expand a range of products available for the user to shop;

maintaining a universal shopping cart to enable a single checkout process for products offered by the plurality of third-party e-commerce platforms;

facilitating completion of a purchase transaction through the user app interface by transmitting purchase and payment information to a transaction system of a selected third-party e-commerce platform, such that the user completes checkout without leaving the user app interface;

in response to completion of the purchase transaction through the user app interface, automatically updating the virtual closet by adding a purchased item to the virtual closet without requiring manual image upload by the user; and generating, by a data dashboard, visualizations associated with a detailed breakdown of revenue generated by each user in real-time, for making timely decisions and responding quickly to market changes, the detailed breakdown comprising total spending, average order value, and a number of purchases over specific time periods, wherein generating the visualizations comprises analyzing purchase transactions of the user over the specific time periods to determine peak buying times, seasonal trends, and an impact of promotions or new arrivals on customer spending.

2. The method of claim 1, wherein the method further comprises obtaining product information of the selected items from the multiple retailers, wherein the product information comprises product name, description, price, specification, image, availability, vendor information, user reviews and ratings, warranty and return policy, shipping details, SKU or product ID, brand, instructions or manuals;

comparing the selected items from the multiple retailers to select a retailer offering the best deal for the user, wherein the comparison is performed by obtaining real-time updates from multiple retailers' databases to provide the most current availabilities;

presenting to the user through the user app interface, the product information of the selected item from the selected retailer;

initiating and receiving a confirmation to purchase the selected item from the user through the user device;

initiating a transaction in response to receiving the confirmation from the user with the selected retailer to purchase the selected item; and transmitting purchase and payment information from the user to a transaction system of the selected retailer for purchase.

3. The method of claim 1, wherein the method further comprises generating the images of the wardrobe inventory of the user based on products searched by the user using textual inputs via the user app interface, wherein the generated images are added to the virtual closet of the user.

4. The method of claim 1, wherein the method further comprises providing (i) a store locator feature to guide the user to nearby physical stores carrying desired products, and (ii) in-store navigation in supported stores to direct the user to the location of products.

5. The method of claim 1, wherein the method further comprises enabling (i) social sharing of the selected items added to a virtual cart, finds, and reviews with friends and family, and (ii) access to external databases that assist the user in making informed purchasing decisions.

6. The method of claim 1, wherein the method further comprises, integrating a video shopping component that allows the user to watch shoppable videos featuring products; and displaying a correlated product feed under a video feed to allow the user to shop for products featured in the video in real-time.

7. The method of claim 1, wherein the method further comprises allowing the user to interface with the personal stylist virtually via in-app chat and video styling sessions.

8. The method of claim 1, wherein the method further comprises enabling the stylist to provide tailored product suggestions to multiple users based on their preferences and past purchases.

9. The method of claim 1, wherein the method further comprises aggregating and displaying detailed statistics about the user's wardrobe including inventory count, total value, and usage metrics via the data dashboard.

10. The method of claim 1, wherein the method further comprises synchronizing with the user's calendar to provide outfit suggestions for specific events and occasions.

11. The method of claim 1, wherein the method further comprises sending notifications to the user about discounts, sales, and special offers on the selected items, wherein the frequency of notifications is automatically tuned based on the user's interaction patterns with the AI-guided omnichannel shopping application.

12. A system for providing a personalized shopping experience using an AI-guided omnichannel shopping application, wherein the system comprises:

a user device associated with a user;

a server; and a memory communicably connected to the server and storing instructions that, when executed by the server, cause the server to:

receive, via a user app interface presented on the user device associated with the user, user data comprising user styling preferences, shopping habits, and images of the user's personal wardrobe inventory;

process, by an image processing module executed on the server, images of the personal wardrobe inventory of the user by extracting data points including a type, a brand, a size, a color, and a condition of the wardrobe inventory from the images by removing backgrounds to provide a virtual closet for the user, wherein the processed images are categorized based on the extracted data points in the virtual closet of the user;

create, via the server, a personalized shopping environment based on the virtual closet and on outfits derived from the virtual closet, the virtual closet and the outfits being shared with friends or on social media, wherein the server is configured to control privacy of the shared virtual closet to limit access to the shared virtual closet based at least on the user;

filter product data obtained from multiple retailers to provide a personalized product feed source, wherein the personalized product feed source comprises selected items to match the user's style preferences, wherein the product data is obtained from both online and offline resources;

integrate augmented reality (AR) features to enable personalized AI search tools of the selected items comprising clothing and accessories, wherein the AI search tools utilize a camera of the user device to select items in real-time;

provide a personal stylist interface that allows a stylist to access the virtual closet of the user and the personalized product feed, wherein the stylist is enabled to mark recommended items, that appear in a dedicated "For You" section in the user app interface;

train, by a training module executed on the server, and continuously update an AI model using interaction data received across multiple channels comprising e-commerce platforms, video feeds, social media interactions, and stylist interactions;

capture stylist interaction data associated with stylist recommendations provided through the personal stylist interface and use the stylist interaction data as input to continuously refine the AI model;

capture user interaction outcome data associated with user interactions with recommended items, including selection and purchase activity, and use the user interaction outcome data to further refine the AI model;

determine a plurality of attributes associated with the user data, the plurality of attributes comprising virtual closet attributes, usage attributes, and contextual attributes, the virtual closet attributes comprising style, color preference, fabric type, and brand affinity identified from contents of the virtual closet, the usage attributes comprising a frequency with which items of the virtual closet are worn and combinations in which the items are worn, and the contextual attributes comprising seasonal trends and upcoming events;

iteratively refine the AI model, using the plurality of attributes, during operation of the AI-guided omnichannel shopping application to improve relevance and personalization of recommendations over time;

generate personalized product recommendations to the user using the AI model through the user app interface, wherein the personalized product recommendations comprise outfit suggestions that match the user's style preferences and wardrobe needs, complementary products, seasonal and trending items and exclusive offers and deals;

integrate the AI-guided omnichannel shopping application with a plurality of third-party e-commerce platforms to expand a range of products available for the user to shop;

maintain a universal shopping cart to enable a single checkout process for products offered by the plurality of third-party e-commerce platforms;

facilitate completion of a purchase transaction through the user app interface by transmitting purchase and payment information to a transaction system of a selected third-party e-commerce platform, such that the user completes checkout without leaving the user app interface;

in response to completion of the purchase transaction through the user app interface, automatically update the virtual closet by adding a purchased item to the virtual closet without requiring manual image upload by the user; and generate, by a data dashboard, visualizations associated with a detailed breakdown of revenue generated by each user in real-time, for making timely decisions and responding quickly to market changes, the detailed breakdown comprising total spending, average order value, and a number of purchases over specific time periods, wherein generating the visualizations comprises analyzing purchase transactions of the user over the specific time periods to determine peak buying times, seasonal trends, and an impact of promotions or new arrivals on customer spending.

13. The system of claim 12, wherein the server is further configured to generate the images of the wardrobe inventory of the user based on products searched by the user using textual input via the user app interface, wherein the generated images are added to the virtual closet of the user.

14. The system of claim 12, wherein the server is further configured to (i) provide a store locator feature to guide the user to nearby physical stores carrying desired products, and (ii) offer in-store navigation in supported stores to direct the user to the location of products.

15. The system of claim 12, wherein the server is further configured to (i) enable social sharing of the selected items added to a virtual cart, finds, and reviews with friends and family, and (ii) provide access to external databases that assist the user in making informed purchasing decisions.

16. The system of claim 12, wherein the server is further configured to, integrate a video shopping component that allows the user to watch shoppable videos featuring products; and display a correlated product feed under a video feed to allow the user to shop for products featured in the video in real-time.

17. The system of claim 12, wherein the server is further configured to (i) allow the user to interface with the personal stylist virtually via in-app chat and video styling sessions, and (ii) enable the stylist to provide tailored product suggestions to multiple users based on their preferences and past purchases.

18. The system of claim 12, wherein the server is further configured to aggregate and display detailed statistics about the user's wardrobe including inventory count, total value, and usage metrics via the data dashboard.

19. A non-transitory computer-readable storage medium storing instructions to cause a server to perform a method for providing a personalized shopping experience using an AI-guided omnichannel shopping application, wherein the server is configured to, receive, via a user app interface presented on a user device associated with a user, user data comprising user styling preferences, shopping habits, and images of the user's personal wardrobe inventory;

process, by an image processing module executed on the server, images of the personal wardrobe inventory of the user by extracting data points including a type, a brand, a size, a color, and a condition of the wardrobe inventory from the images by removing backgrounds to provide a virtual closet for the user, wherein the processed images are categorized based on the extracted data points in the virtual closet of the user;

create, via the server, a personalized shopping environment based on the virtual closet and on outfits derived from the virtual closet, the virtual closet and the outfits being shared with friends or on social media, wherein the server is configured to control privacy of the shared virtual closet to limit access to the shared virtual closet based at least on the user;

filter product data obtained from multiple retailers to provide a personalized product feed source, wherein the personalized product feed source comprises selected items to match the user's style preferences, wherein the product data is obtained from both online and offline resources;

integrate augmented reality (AR) features to enable personalized AI search tools of the selected items comprising clothing and accessories, wherein the AI search tools utilize a camera of the user device to select items in real-time;

provide a personal stylist interface that allows a stylist to access the virtual closet of the user and the personalized product feed, wherein the stylist is enabled to mark recommended items, that appear in a dedicated "For You" section in the user app interface;

train, by a training module executed on the server, and continuously update an AI model using interaction data received across multiple channels comprising e-commerce platforms, video feeds, social media interactions, and stylist interactions;

capture stylist interaction data associated with stylist recommendations provided through the personal stylist interface and use the stylist interaction data as input to continuously refine the AI model;

capture user interaction outcome data associated with user interactions with recommended items, including selection and purchase activity, and use the user interaction outcome data to further refine the AI model;

determine a plurality of attributes associated with the user data, the plurality of attributes comprising virtual closet attributes, usage attributes, and contextual attributes, the virtual closet attributes comprising style, color preference, fabric type, and brand affinity identified from contents of the virtual closet, the usage attributes comprising a frequency with which items of the virtual closet are worn and combinations in which the items are worn, and the contextual attributes comprising seasonal trends and upcoming events;

iteratively refine the AI model, using the plurality of attributes, during operation of the AI-guided omnichannel shopping application to improve relevance and personalization of recommendations over time;

generate personalized product recommendations to the user using the AI model through the user app interface, wherein the personalized product recommendations comprise outfit suggestions that match the user's style preferences and wardrobe needs, complementary products, seasonal and trending items and exclusive offers and deals;

integrate the AI-guided omnichannel shopping application with a plurality of third-party e-commerce platforms to expand a range of products available for the user to shop;

maintain a universal shopping cart to enable a single checkout process for products offered by the plurality of third-party e-commerce platforms;

facilitate completion of a purchase transaction through the user app interface by transmitting purchase and payment information to a transaction system of a selected third-party e-commerce platform, such that the user completes checkout without leaving the user app interface;

in response to completion of the purchase transaction through the user app interface, automatically update the virtual closet by adding a purchased item to the virtual closet without requiring manual image upload by the user; and generate, by a data dashboard, visualizations associated with a detailed breakdown of revenue generated by each user in real-time, for making timely decisions and responding quickly to market changes, the detailed breakdown comprising total spending, average order value, and a number of purchases over specific time periods, wherein generating the visualizations comprises analyzing purchase transactions of the user over the specific time periods to determine peak buying times, seasonal trends, and an impact of promotions or new arrivals on customer spending.

* * * * *